United States Patent
Doria Iriarte

(10) Patent No.: US 10,683,840 B2
(45) Date of Patent: Jun. 16, 2020

(54) DEVICE FOR CONVERTING THE KINETIC ENERGY OF WAVES, WATER FLOWS OR WIND INTO MECHANICAL ENERGY

(71) Applicant: Arrecife Energy Systems S.L., Bizkaia (ES)

(72) Inventor: Jose Javier Doria Iriarte, Bilbao (ES)

(73) Assignee: Arrecife Energy Systems S.L., Bizkaia (ES)

(*) Notice: Subject to any disclaimer, the term of this patent is extended or adjusted under 35 U.S.C. 154(b) by 0 days.

(21) Appl. No.: 15/764,548

(22) PCT Filed: Jun. 23, 2016

(86) PCT No.: PCT/ES2016/070474
§ 371 (c)(1),
(2) Date: Mar. 29, 2018

(87) PCT Pub. No.: WO2017/055649
PCT Pub. Date: Apr. 6, 2017

(65) Prior Publication Data
US 2018/0274516 A1    Sep. 27, 2018

(30) Foreign Application Priority Data
Sep. 29, 2015 (EP) ................... 15382473

(51) Int. Cl.
*F03B 17/06* (2006.01)
*F03B 13/22* (2006.01)
*F04D 29/28* (2006.01)

(52) U.S. Cl.
CPC ............ *F03B 17/063* (2013.01); *F03B 13/22* (2013.01); *F04D 29/283* (2013.01);
(Continued)

(58) Field of Classification Search
CPC ...... F03B 17/063; F03B 13/22; F04D 29/283; Y02E 10/28; F05B 2240/244
See application file for complete search history.

(56) References Cited

U.S. PATENT DOCUMENTS

| 5,136,174 A * | 8/1992 | Simoni ................. F03B 17/062 290/43 |
| 2006/0177303 A1 * | 8/2006 | Cochran ................ F03B 3/121 415/204 |

(Continued)

FOREIGN PATENT DOCUMENTS

| ES | 2074010 | 8/1995 |
| KR | 100191636 | 6/1999 |

(Continued)

OTHER PUBLICATIONS

International Search Report and Written Opinion of corresponding PCT Application No. PCT/ES2016/070474, dated Sep. 14, 2016.

(Continued)

*Primary Examiner* — Sean Gugger
(74) *Attorney, Agent, or Firm* — Gardner Linn

(57) ABSTRACT

An energy conversion device includes a plurality of cross flow turbines, each one including fixed curved blades arranged in squirrel cage configuration about an axis of rotation. The turbines are mounted on a floating support on the water, placed directly in the fluid flow and arranged successively one after another with their axes parallel to each other and perpendicular to the flow.

8 Claims, 5 Drawing Sheets

(52) U.S. Cl.
CPC ..... *F05B 2240/244* (2013.01); *F05B 2240/93* (2013.01); *Y02E 10/28* (2013.01); *Y02E 10/38* (2013.01)

(56) References Cited

U.S. PATENT DOCUMENTS

| | | | | |
|---|---|---|---|---|
| 2008/0232965 | A1* | 9/2008 | Fraenkel | F03B 17/061 416/85 |
| 2009/0175723 | A1* | 7/2009 | Broome | F03B 1/00 416/31 |
| 2010/0237625 | A1* | 9/2010 | Dempster | F03B 7/00 290/54 |
| 2011/0254275 | A1* | 10/2011 | Joseph | F03B 13/144 290/53 |
| 2012/0007361 | A1* | 1/2012 | Agtuca | H02P 9/04 290/43 |
| 2013/0026761 | A1* | 1/2013 | Rajadhyaksha | F03B 17/062 290/54 |
| 2013/0069369 | A1* | 3/2013 | Salehpoor | F03B 7/00 290/53 |
| 2013/0115045 | A1* | 5/2013 | Korac | F03B 17/064 415/8 |
| 2013/0229014 | A1* | 9/2013 | Willingham | F03B 17/063 290/54 |
| 2015/0252776 | A1* | 9/2015 | Van Rompay | F03B 17/063 290/54 |
| 2015/0354528 | A1* | 12/2015 | Van Rompay | F03B 11/02 290/54 |
| 2016/0208765 | A1* | 7/2016 | Kim | F03D 9/008 |
| 2017/0130690 | A1* | 5/2017 | Lilly | F03B 13/00 |
| 2018/0003148 | A1* | 1/2018 | Lee | F03B 13/26 |

FOREIGN PATENT DOCUMENTS

| | | |
|---|---|---|
| KR | 1020110107881 | 10/2011 |
| KR | 101492768 | 2/2015 |
| WO | 2005061887 | 7/2005 |
| WO | 2014111800 | 7/2014 |

OTHER PUBLICATIONS

Doria Iriarte Jose Javier, Theory innovation on Aerodynamics. Prototypes and patents, III International Congress of Project Engineering, Aug. 30, 2016, p. 438-447, vol. 2, Spain.

* cited by examiner

DEVICE FOR CONVERTING THE KINETIC ENERGY OF WAVES, WATER FLOWS OR WIND INTO MECHANICAL ENERGY

FIELD OF THE INVENTION

The invention relates generally to a low cost device that makes an efficient use of the energy from waves or water or wind currents, such as for pumping sea water and for generating electricity by harnessing energy from the sea waves.

BACKGROUND OF THE INVENTION

Known are in the art the devices for converting kinetic energy from a flow of waves, wind or water currents into mechanical energy of rotation (for generation of electricity), comprising a cross flow turbine, the turbine being provided with fixed curved blades arranged in squirrel cage configuration about an axis of rotation.

Examples of these devices are described in documents KR100191636 B1 and KR101492768B1.

KR100191636 B1 discloses a turbine mounted on two floaters that maintain the lower half of the turbine immersed, thus causing that the flow that passes between the floaters rotates the turbine.

In KR101492768 B1 a turbine mounted on a floating device is shown, but the arrangement of the turbine is fully sunk. The device is complex, since it comprises a surrounding casing designed to channel water in the lower part of the turbine.

In general, the squirrel configuration turbines with fixed blades that operate in liquid fluids are provided with a deflector aimed at channeling the fluid through the outer portion of the turbine, and only through one side of the turbine.

Thus, in general the known devices that operate with squirrel configuration turbines are complex devices that do not allow to maximize the harnessing of the energy of the incident flow. In particular, these devices do not allow to optimally extract energy from the waves energy, namely at the level of the water surface, and in general their structure is complex and cumbersome.

SUMMARY OF THE INVENTION

To overcome the shortcomings of the prior art, the present invention proposes a device for converting kinetic energy of a flow from waves, wind or water currents into mechanical energy of rotation (for generation of electricity), comprising a plurality of cross flow turbines, each one comprising fixed curved blades arranged in squirrel cage configuration about an axis of rotation. According to an aspect of the invention the turbines are mounted on a floating support on the water, directly placed in the fluid flow and arranged successively one after another with their axes parallel to each other and perpendicular to the fluid flow.

This device is specially adapted to make efficient use of energy from waves, wind and water currents, and it is very robust and economical since it makes use of low cost cross-flow turbines, without the need of costly deflectors, baffles or flow channeling means designed to channel the flow in only a part of the turbines. The successive turbines allow for successively diminishing the flow energy, and then, the energy remaining after the flow having gone through a turbine is harnessed in the subsequent one.

In particular, the invention is very advantageous for its use in harnessing wave energy. The wave front, when reaching the turbines, mainly involves a vertical movement of the particles (molecules), which can be harnessed by the turbine. As the wave front progresses through successive turbines, it breaks, which means that the movement of the flow acquires progressively a horizontal direction, which can then be exploited by the following turbines.

In the case of the waves devices, where the water particles (molecules) oscillate vertically, describing trochoidal trajectories and creating powerful surface currents in the form of breakers, the turbines as used according to aspects of the present invention will always rotate in the same rotating direction independently of the incident flow, which in turn allows simplifying the electrical elements or downstream power electronics that will eventually be connected to the turbines. It works as a reef of offshore turbines or onshore breaker.

According to several optional features that can be combined with each other whenever technically possible:

When operating as a wave's device, the axes of the turbines are parallel and horizontally mounted on the floating hulls structure support. In particular, this has to be understood as that the axes of the turbines are mounted on the floating support such that the axes are arranged horizontally when the device is placed in the water. This arrangement is particularly suited to take advantage of the surface energy of a vertical and horizontal stream of water. It also implies a reduced space occupation in the vertical direction, allowing it to be used in shallow waters or as a breakwater. It also facilitates placement and removal of the device in and out of the water with a tugboat or other vessel.

the axes of the turbines are contained in the same plane, thus allowing to optimally successively harnessing the waves flow energy.

the floating support has a U-cross section profile that forms a channel, such that a bottom hull or wall and two side hulls or walls, the axes of the turbines being rotatably supported between the two side hulls. This structure allows the hulls simultaneously supporting the turbines, to protect them inferiorly and to channel water to the turbines as well as an easy access to the turbines from above.

the structure comprises floating control apparatus(es) so that the device is movable between a lower position where the turbines are completely sunk and an upper position where the turbines are arranged completely above the water level. Thus, the turbines can be accessed for maintenance and the device can be moved along waters of varying depth. Thus, when placed in the waves the device will operate as a reef or a breakwater and it will be possible to adjust its vertical position to optimize the performance or to minimize the impact of storms.

the floating control apparatuses may be floodable floats, for example.

In another variant of the invention, the axes of the turbines are vertically mounted with respect to the floating support. In this variant, the axes of the turbines can be arranged above the floating support for harnessing wind energy or placed under the level of the floating structure to operate as a water current power plant.

In all the variants described, it is envisaged that optionally:
the axes of the turbines are arranged at regular intervals.
the blades of the turbines have a cylindrical envelope.

the floating support comprises anchoring devices for securing it to the seabed, to prevent any takeoff but allowing some rotation around the anchor.

These and other objects, advantages and features of the invention will become apparent upon review of the following specification in conjunction with the drawings.

BRIEF DESCRIPTION OF THE DRAWINGS

To complete the description and in order to provide for a better understanding of the invention, a set of drawings is provided. The drawings form an integral part of the description and illustrate embodiments of the invention, which should not be interpreted as restricting the scope of the invention, but just as examples of how the invention can be carried out. The drawings comprise the following figures:

FIG. 9c is analogous to FIG. 9a but in the case of its application to wind, with the turbines on the upper part; and.

DESCRIPTION OF THE PREFERRED EMBODIMENTS

Figure 1:
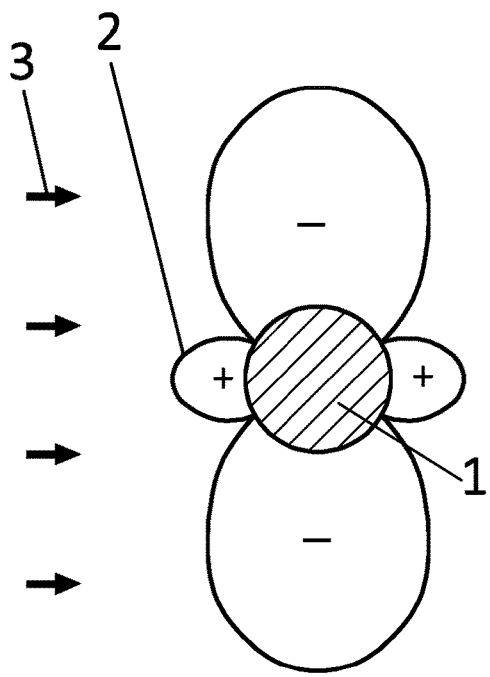
FIG. 1 shows the theoretical pressure distribution on the surface of a circular cylinder according to the classical theory.

As it can be seen in FIG. 1, according to the classical theory and in the case of a perfect fluid, there would be no resistance or drag on a solid placed in a moving fluid because of the equilibration of the pressures in the front and back sides of the solid 1. Therefore, this theory gives rise to the D'Alembert's paradox, in which theoretically the drag force is zero on a body moving with constant velocity relative to the fluid, in direct contradiction to the observation of substantial drag on bodies moving relative to fluids.

Consequently, according to the classical theory, if the solid were a cylinder there would not be a pressure difference between the two halves of the cylinder. This would apply to a turbine squirrel cage, whose envelope is cylindrical, so that according to this theory, there would be no possibility of extracting energy from the turbines placed fully facing the flow, i.e. without deflectors or water channeling means to the halves of the turbines 9 as disclosed in the documents of the prior art.

Figure 2:
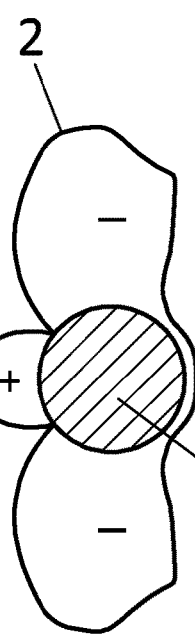
FIG. 2 shows the experimental pressure distribution on the surface of a circular cylinder.

Instead, the practical implementation of the invention has led to industrially well tested experimental results. In particular, it has been determined that an existing suction action by the downstream flow prevents from the theoretical existence of positive pressures on the back of the cylinder 1, as shown in FIG. 2 for a cylinder or an outboard edged cylinder as shown in FIG. 3.

Figure 3:
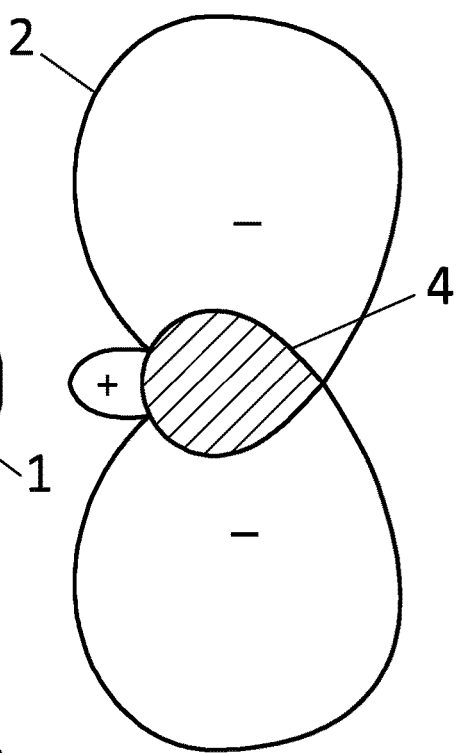
FIG. 3 shows the theoretical pressure distribution on an outboard aerodynamic shaped circular cylinder.

This formulation developed for cylinders and other simple shapes, clearly states that the pressure distribution as shown at reference numeral 2 in FIG. 3 has a pressure gradient in the outside flow direction 3 enabling forcing the fluid flow in a cylindrical turbine without deflectors or distributors.

Figure 4:
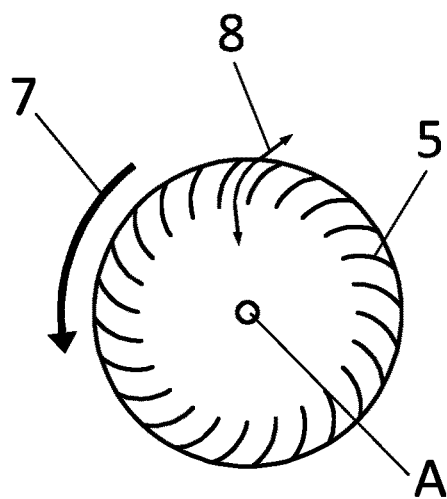
FIG. 4 shows the cross section of a crossflow turbine with bent sheet blades.

Any fluid passing through the cylindrical turbine area, as shown at reference numeral 8 in FIG. 4, is deflected by the curvature of the blades thus creating a reaction in the blades with respect to the axis always of the same sign and consequently the turbine 9 will always rotate in the same direction independently of the flow. This facilitates its practical implementation jointly with rotary pumps or generators, in practice better than the alternative ones.

Figure 5:
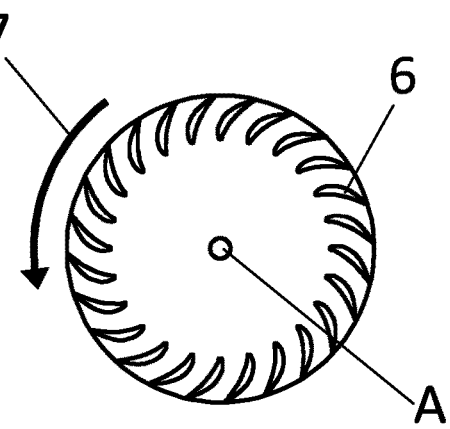
FIG. 5 shows the cross section of a crossflow turbine with aerodynamic blades.
Figure 7:
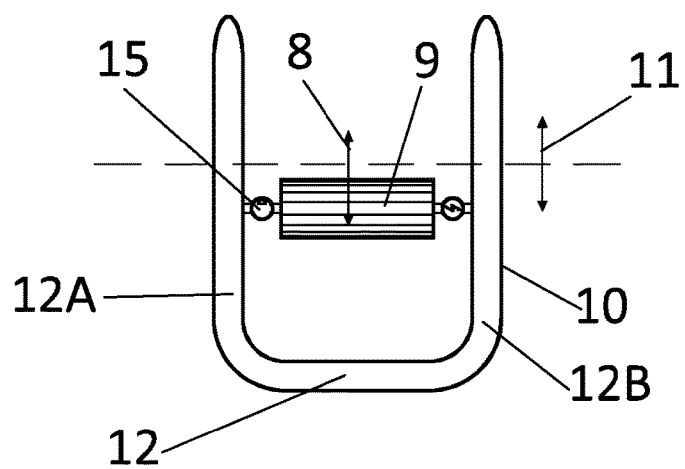
FIG. 7 shows the above arrangement in a transverse or profile view, to indicate the oscillating level of the water in the presence of waves.

The inventive energy recovery device 19 in its most general form utilizes an arrangement of several crossflow type cylindrical turbines 9, as shown in FIG. 4 and in FIG. 5, with their axes parallel, spaced apart, interposing the water flow as shown in FIG. 7, which based in the physical principle described above, impinges on the curved blades at reference numeral 5 in FIG. 4 and reference numeral 6 in FIG. 5, such that the turbine always rotates in the same direction (such as indicated at reference numeral 7 in FIG. 4) regardless of the direction or characteristics of the flow indicated by reference numeral 8 in FIG. 4. In particular, and as shown in FIG. 9b, in the case of waves 13, all the turbines will rotate with the same rotation direction. In this case, the front of energy is represented by the water level 18.

Figure 8:
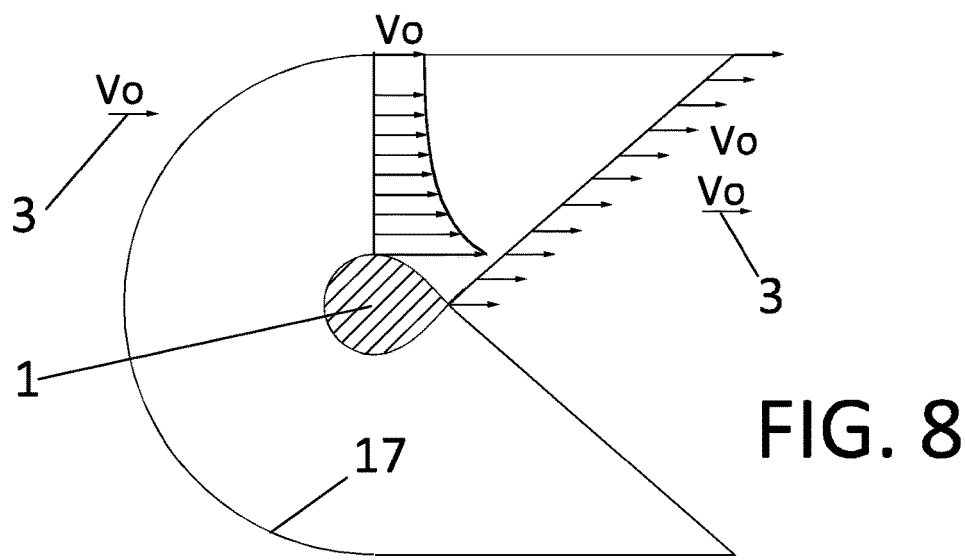
FIG. 8 shows the flow characteristics affected by an aerodynamic shaped outboard edged circular cylinder according to research related to the invention, emphasizing the boundary zone between the uniform outer flow and the altered zone or affected by the solid.

The implementation of the invention was inspired using the velocity distribution obtained analytically, as shown in FIG. 8. In particular, the fluid area affected by the cylinder 17 (FIG. 8) indicates that the active fluid front 3 is defined as a close and finite environment.

Figure 6:
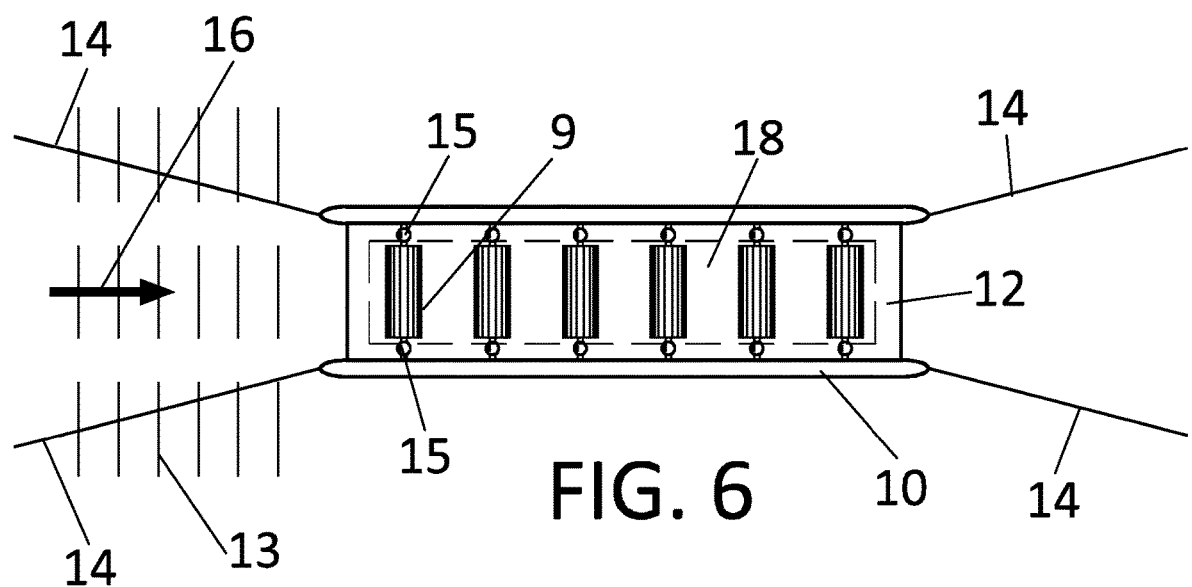
FIG. 6 shows the arrangement of several turbines supported on an anchored hull floating base to harness the energy of a wave front.
Figure 9A:
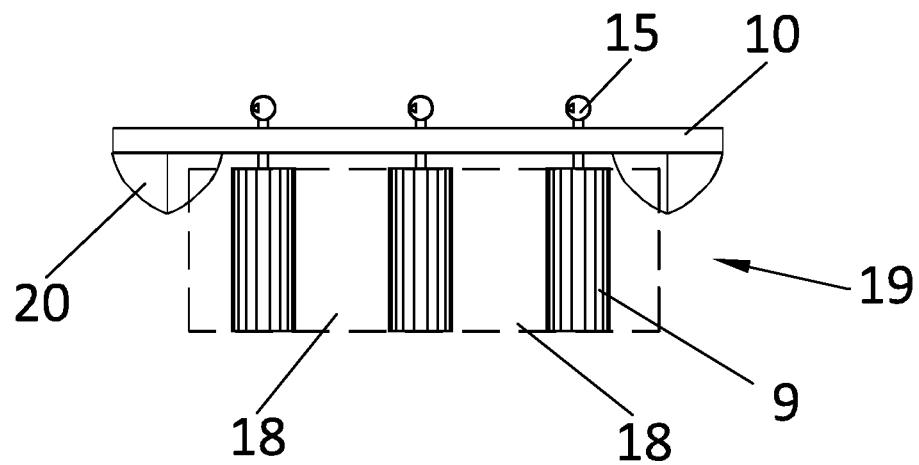
FIG. 9a shows the arrangement of the floating support and turbines to extract energy from a water stream.
Figure 9B:
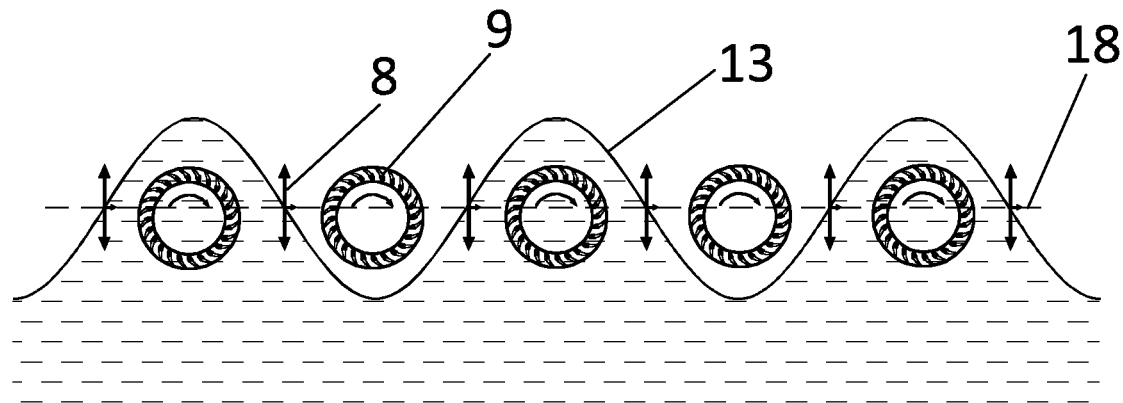
FIG. 9b is a profile showing a series of turbines mounted with their axes in the same plane to extract energy from the waves.
Figure 9C:
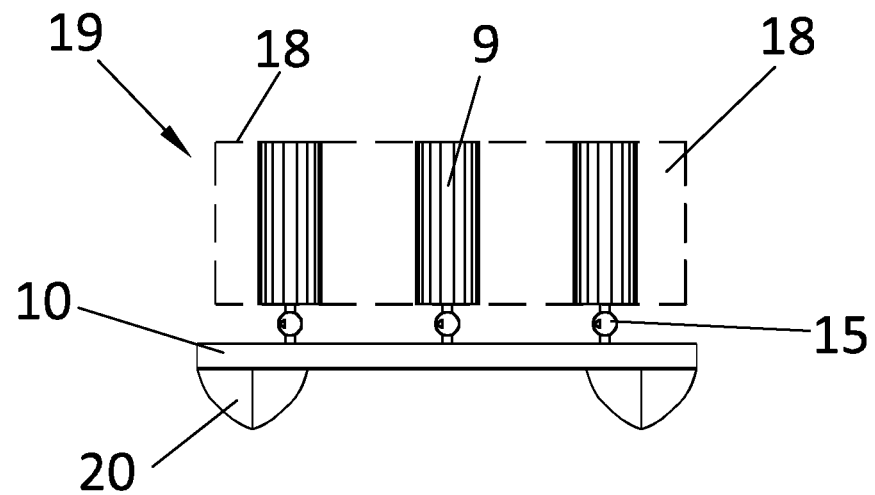

The cylindrical crossflow turbines 9, which do not unfavorably interfere with each other, will be arranged with their axes in parallel, such as shown in FIG. 6, interposed in the energy flow 16, such as shown in FIGS. 7, 9a and 9c.

The rotational energy in the turbine, with low angular speed and high torque, will then be transformed by conventional means into electrical, hydraulic or mechanical energy.

To maintain a maximum turbine 9 resistance against the impulse of the fluid, in the case of the waves energy recovering system (vertical and horizontal flow) an anchor 14 and a horizontal stabilizer are also necessary. Flooding tubes arranged in the side hulls 12A, 12B allow adjusting the vertical position. Specifically, it will allow to sink the turbines 9 in cases of storms or to take them out from the water for maintenance. In the case of recovering energy from currents any known anchoring system is usable.

This floating support 10 can have water passage slits to destabilize the wave together with the effect of turbines and make the wave breaks.

The type of waves to be found in the installation site, and the cost's and capacity's installation will condition the size, number and arrangement of the turbines, as well as its funding. Its physical effect will be that of a reef in a floating off shore installation. If its location is made by a breakwater on the coast, its effect will be like a breakwater one.

Given the high torque and uneven rotation provided by the waves, it can be very useful and economical to pump seawater at high pressure to a reservoir on land or then turbinate or pump sea water to a desalination unit by reverse osmosis, or any other known type of use that avoids energy transformation stages. The auxiliary equipment may be located within the floating support 10 (FIG. 7) or on land, to where the desalinate water, compressed air, water or oil pressure or electric power, would head according to the chosen design.

Optionally, cylindrical turbines 9 can be arranged as shown in FIGS. 4-7, in the device 19, of the type used in crossflow turbines. They include a series of curved blades preferably arranged in a squirrel cage as shown in FIGS. 4 and 6, reacting to the passage of fluid with a torque always the same sign, even with a changing direction of flow on the blade.

The preferred shape of the profiles will be such as the described in the patent ES2074010 by the same inventor, like the profiles shown in FIG. 5, or may be a simple bent plate or any curved surface 5 (FIG. 4) for economy purposes.

The cylindrical turbine will have the side faces or bases of the cylinder closed to the flow with two disks which also support the blades and the mechanical axis, comprising also other intermediate discs to stiffen the blades, as it is usual in this type of turbine. The diameter and height of the cylindrical turbine will depend on the flow characteristics and power requirements and available space, its calculation preferably developed through the equations described for example in Doria J. J., Granero F., *TEORÍA INNOVADORA EN AERODINÁMICA. PROTOTIPOS Y PATENTES Actas III Congreso Internacional de Ingeniería de Proyectos.* 1.996 Barcelona.

The shaft, as described, is arranged perpendicular to the foreseeable and variable flow directions and it is connected to any known power transmitting device 15 (such as a pump, generator, compressor, gear, etc.).

FIG. 9a shows an embodiment of the device 19 for the harnessing of a water stream, illustrated as a rectangular front 18. Here, the turbines are placed with their axes vertical, under the floating support 10, which is in turn supported by two hulls 20. Only the first turbine of each row is shown, and it will be understood that the successive turbines are placed behind.

FIG. 9c shows an embodiment of the device 19 analogous to that shown in FIG. 9a, but designed to harness the energy of a wind stream, and therefore the turbines are placed with their axes above the floating support.

Figure 10:
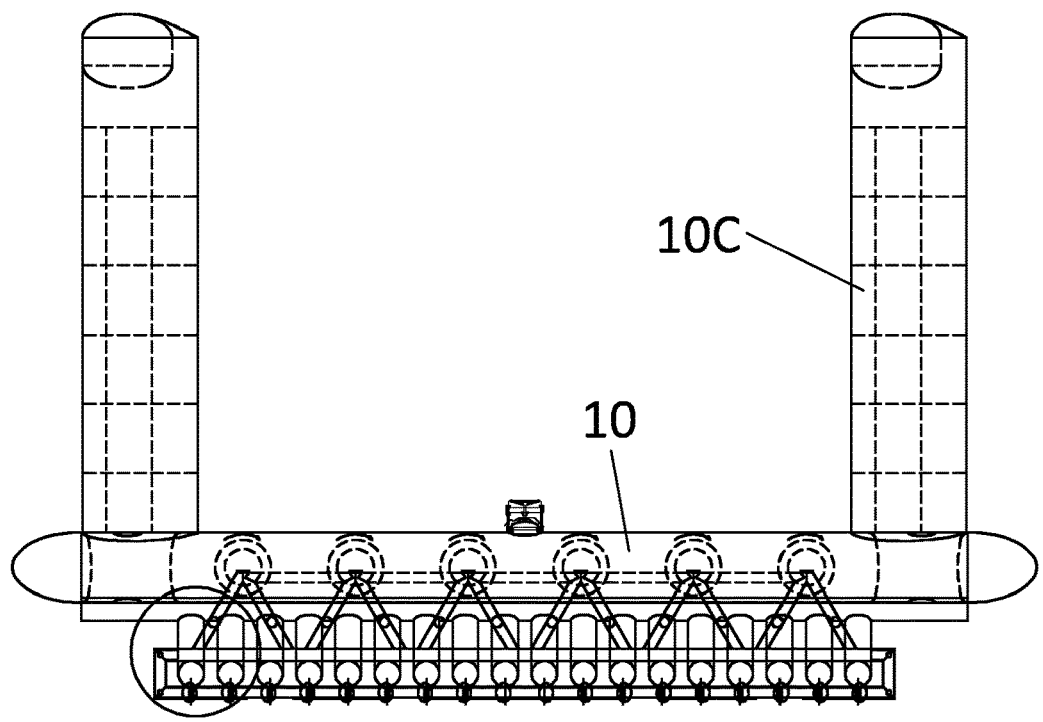
FIGS. 10-12 show a side elevated view, a plan view and a frontal elevated view, respectively, of an exemplary embodiment of the present invention.
Figure 11:
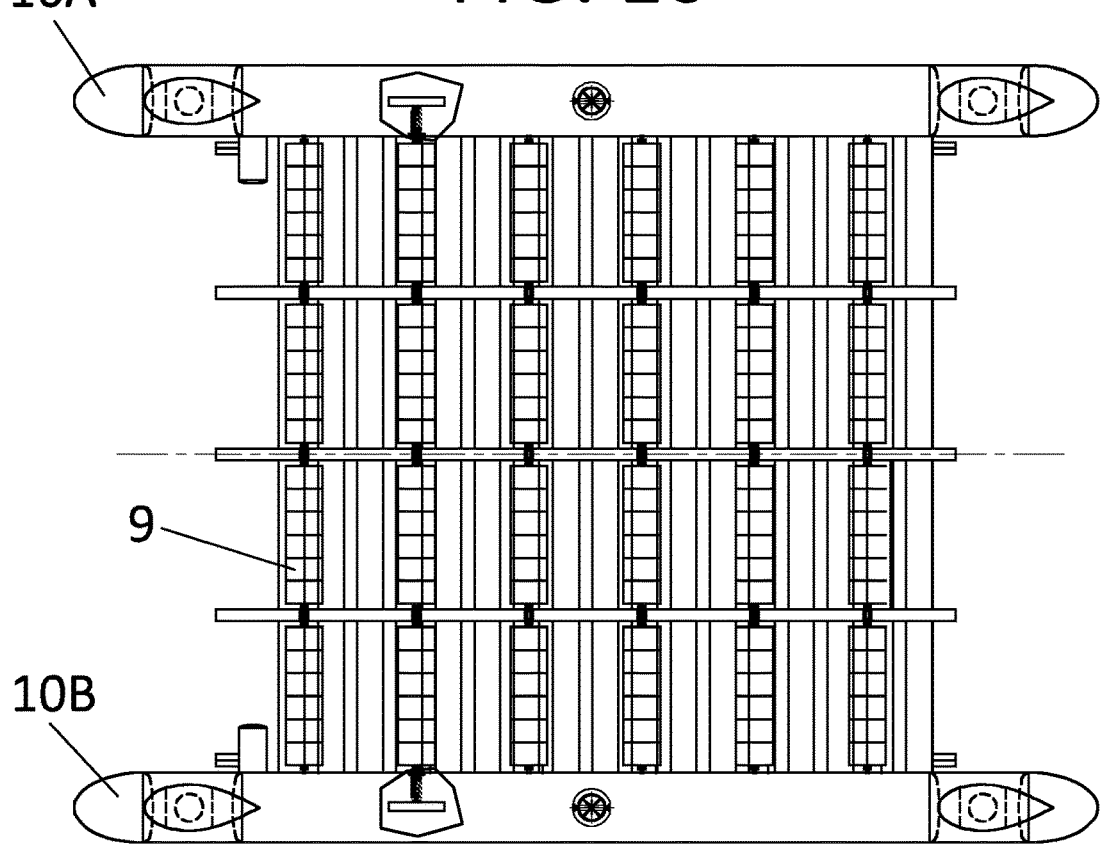
Figure 12:
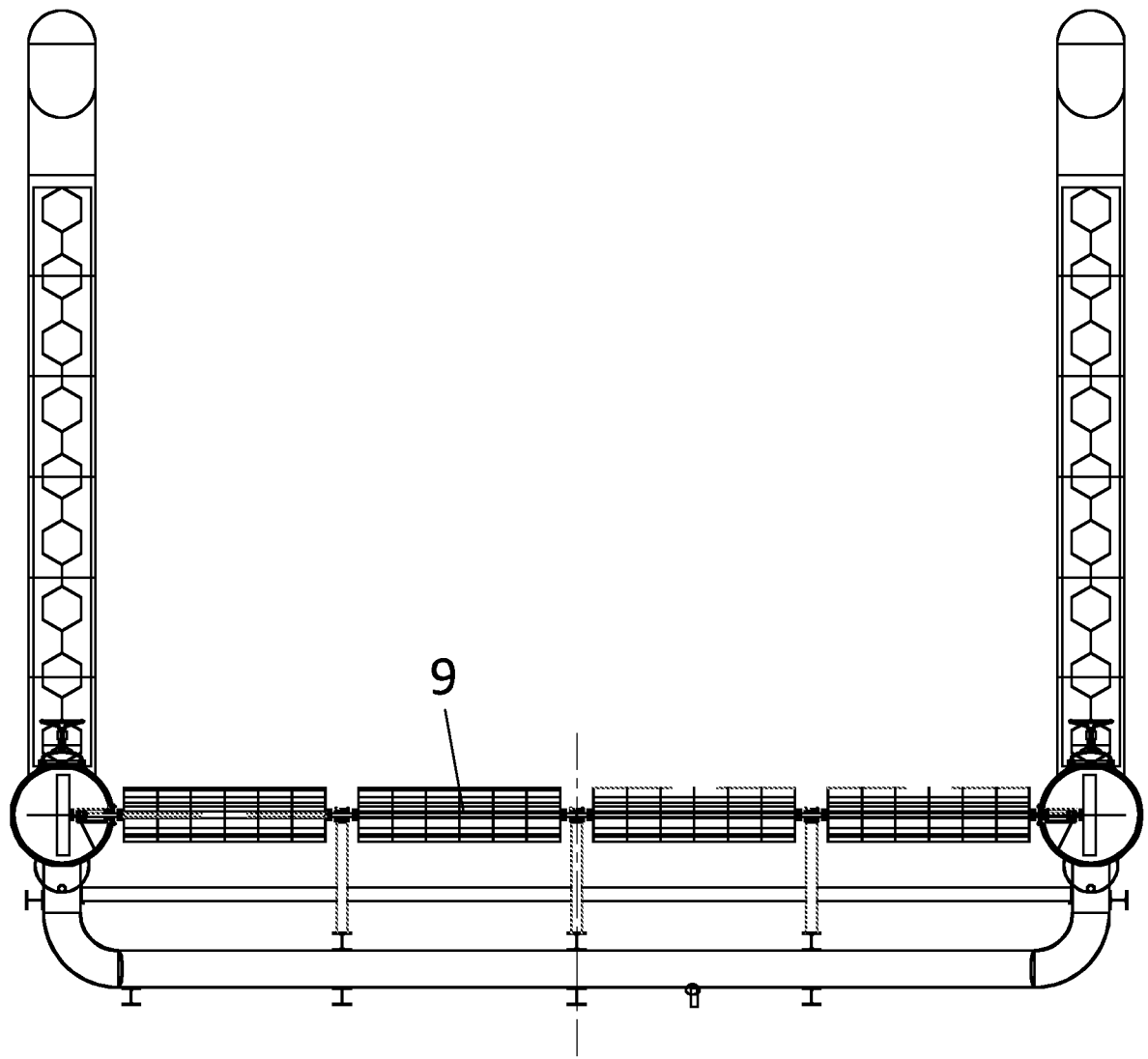

FIGS. 10 to 12 show an embodiment comprising four rows, each provided with six successive turbines 9, arranged with their axes horizontal and in the same plane. The floating support 10 is basically a catamaran wherein the two hulls 10A, 10B support the axes of the turbines 9. Four rigid sails or wings 10C fixed on the ends of the hulls 10A, 10B serve for orienting the base. The hulls 10A, 10B have floodable spaces inside that can extend in reservoirs placed inside the wings, which then contribute to control the water level. Although there are six turbines in each row, it will be appreciated that more turbines can be provided to harness the maximum energy from the waves or current.

In this text, the term "comprises" and its derivations (such as "comprising", etc.) should not be understood in an excluding sense, that is, these terms should not be interpreted as excluding the possibility that what is described and defined may include further elements, steps, etc.

The invention is not limited to the embodiments described herein, but can be amended or modified without departing from the scope of the present invention, which is intended to be limited only by the scope of the appended claims as interpreted according to the principles of patent law including the doctrine of equivalents. As such, the invention encompasses any variations that may be considered by any person skilled in the art (for example, as regards the choice of materials, dimensions, components, configuration, etc.), within the general scope of the invention as defined in the claims.

The invention claimed is:

1. A device for converting kinetic energy from a fluid flow of waves or water currents into mechanical energy of rotation, said device comprising a plurality of cross flow turbines, each one comprising fixed curved blades arranged about an axis of rotation to define a cylindrical turbine area having an open interior through which water may pass, wherein the turbines are mounted on a floating support on the water, such that the turbines can be directly placed in the fluid flow, and arranged successively one after another with their axes parallel to each other and perpendicular to the fluid flow, wherein the floating support has a U-cross section profile that forms a channel, such that a bottom hull and two side hulls are defined, the axes of the turbines being rotatably supported between the two side hulls, and wherein the floating support comprises a floating control apparatus including floodable floats so that the device is movable between a lower operative position in which the turbines are completely sunk and an upper position in which the turbines are arranged completely above the water level.

2. The device of claim 1, wherein the axes of the turbines are contained in the same plane.

3. The device of claim 1, wherein the axes of the turbines are arranged at regular intervals.

4. The device of claim 1, wherein the blades of the turbines are arranged in a cylindrical envelope.

5. The device of claim 1, wherein the support comprises an anchor for support to the seabed.

6. The device of claim 1, wherein said device does not comprise any deflectors or baffles.

7. The device of claim 3, wherein the blades of the turbines are arranged in a cylindrical envelope.

8. The device of claim 7, wherein the support comprises an anchor for support to the seabed.

* * * * *